(12) United States Patent
Breuer et al.

(10) Patent No.: US 11,191,120 B2
(45) Date of Patent: Nov. 30, 2021

(54) METHOD FOR OPERATING A USER EQUIPMENT IN A CELLULAR NETWORK

(71) Applicant: Gemalto M2M GmbH, Munich (DE)

(72) Inventors: Volker Breuer, Boetzow (DE); Iavor Antonov, Berlin (DE)

(73) Assignee: THALES DIS AIS DEUTSCHLAND GMBH, Munich (DE)

( * ) Notice: Subject to any disclaimer, the term of this patent is extended or adjusted under 35 U.S.C. 154(b) by 176 days.

(21) Appl. No.: 16/470,773

(22) PCT Filed: Dec. 14, 2017

(86) PCT No.: PCT/EP2017/082906
§ 371 (c)(1),
(2) Date: Jun. 18, 2019

(87) PCT Pub. No.: WO2018/114624
PCT Pub. Date: Jun. 28, 2018

(65) Prior Publication Data
US 2020/0015306 A1    Jan. 9, 2020

(30) Foreign Application Priority Data
Dec. 21, 2016   (EP) ..................................... 16205792

(51) Int. Cl.
*H04W 76/16*    (2018.01)
*H04W 72/04*    (2009.01)
*H04W 88/06*    (2009.01)

(52) U.S. Cl.
CPC ......... *H04W 76/16* (2018.02); *H04W 72/042* (2013.01); *H04W 72/048* (2013.01); *H04W 72/0453* (2013.01); *H04W 88/06* (2013.01)

(58) Field of Classification Search
CPC ..... H04L 5/001; H04L 5/0033; H04L 5/0058; H04L 5/0085; H04L 5/0096; H04L 69/14;
(Continued)

(56) References Cited

U.S. PATENT DOCUMENTS

2016/0028585 A1    1/2016 Wager et al.
2016/0219475 A1*   7/2016 Kim ..................... H05K 999/99
(Continued)

OTHER PUBLICATIONS

"Technical Specification Group Radio Access Network; Evolved Universal Terrestrial Radio Access (E-UTRA) and Evolved Universal Terrestrial Radio Access Network (E-UTRAN) Overall description; Stage 2 (Release 13)", 3GPP Draft, Draft 36300-D30 Wtih Rev Marks, 3$^{rd}$ Generation Partnership Project (3GPP), XP051081566, Mar. 2016, 305 pages, Retrieved from the Internet URL:http://www.3gpp.org/ftp/tsg ran/WG2 RL2/Specifications/201603_draft_specs_after_RAN_71/.
(Continued)

*Primary Examiner* — Awet Haile
(74) *Attorney, Agent, or Firm* — Buchanan Ingersoll & Rooney PC

(57) ABSTRACT

User equipment communicates by means of a primary base node and at least one secondary base node of a cellular network that are respectively assigned to different radio access networks. The user equipment sends a first message comprising its available capabilities to the primary base node, and receives a first indication from the primary base node relating to the capabilities being used by the primary base node. It sends a second message to the secondary base node, comprising those capabilities not being used by the primary base node. and receives a second indication from the secondary base node relating to the capabilities being used by the secondary base node. It sends a third message with still unused capabilities to the primary base node. and initiates a communication link with a remote terminal by means of the primary and the secondary base nodes using the configured capabilities.

15 Claims, 4 Drawing Sheets

(58) Field of Classification Search
CPC .... H04L 69/18; H04L 69/24; H04W 72/0426; H04W 72/0453; H04W 72/048; H04W 76/15; H04W 76/16; H04W 88/06
See application file for complete search history.

(56) References Cited

U.S. PATENT DOCUMENTS

2017/0325143 A1* 11/2017 Dai ................ H04W 36/08
2018/0084539 A1* 3/2018 Kubota ............ H04W 76/15

OTHER PUBLICATIONS

International Search Report (PCT/ISA/210) and Written Opinion (PCT/ISA/237) dated Mar. 13, 2018, by the European Patent Office as the International Searching Authority for International Application No. PCT/EP2017/082906.
Wireless World Research Forum, et al., "LTE Small Cell Enhancement by Dual Connectivity", XP055301402, Nov. 2014, 22 pages, Retrieved from the Internet URL:http://www.wwrf.ch/files/wwrf/content/files/publications/outlook/Outlook15.pdf.
3GPP TSG-RAN WG2 Meeting #95bis, R2-167065, Kaohsiung, Taiwan, Oct. 10-14, 2016, Qualcomm ncorporated (Rapporteur), "Report of e-mail discussion [95#30] Capability coordination for NR and LTE" (40 pages).
Office Action (Notice of Reasons for Rejection) dated Jul. 14, 2020, by the Japan Patent Office in corresponding Japanese Patent Application No. 2019-533589, and English translation of the Office Action. (7 pages).
Office Action (Communication pursuant to Article 94(3) EPC) dated Aug. 24, 2020, by the European Patent Office in corresponding European Patent Application No. 17816804.3 (7 pages).

* cited by examiner

METHOD FOR OPERATING A USER EQUIPMENT IN A CELLULAR NETWORK

FIELD OF THE INVENTION

The present invention relates to a method for operating a user equipment in a cellular network. The invention further relates to a user equipment using said method.

The invention also pertains to a method for handling a user equipment in a cellular network. The invention further relates to a cellular network using said method.

BACKGROUND OF THE INVENTION

In the field of wireless communication the trend of an enormous increase of data throughput requirement is evident. In wireless communication the air interface resp. the available frequency ranges and the expected cell size are limiting factors.

Current approaches try to solve the issue by an approach called carrier aggregation, where two carriers, in particular two base nodes resp. eNodeBs of a cellular network together serve a data throughput demanding user equipment. For that the cellular network resp. the radio access network of the involved base nodes currently coordinates the distribution of resources between both base nodes.

Furthermore, in the coming technology standard called 5G or New Radio it is foreseen that LTE (4G) and 5G shall co-exist and interwork. Consequently an interworking between both technologies would also be advantageous with regards to carrier aggregation. However, the mentioned resource coordination would in such case needed to be done by two radio access networks, in particular its network components. That would require an enormous overhead of interface definition between 4G and 5G networks. Furthermore other networks like Wimax, Wifi could additionally be planned to be used for the same purpose. Effectively this would lead to an enormous increase in network communication over many network interfaces which are missing today.

It is therefore the goal of present invention to propose an alternative solution for an improved resource coordination of user equipments operating in wireless cellular networks by using carrier aggregation.

Further alternative and advantageous solutions would, accordingly, be desirable in the art.

SUMMARY OF THE INVENTION

For this it is according to a first aspect of the invention suggested a method to operating a user equipment according to claim 1. It is further suggested according to a second aspect of the invention a user equipment according to claim 7. According to a third aspect of the invention it is suggested a method for a cellular network to operate a user equipment according to claim 11. It is further proposed according to a fourth aspect of the invention a cellular network according to claim 15.

According to the first aspect of the invention it is proposed a method for operating a user equipment communicating in parallel by means of a primary base node and at least one secondary base node of a cellular network with a remote terminal, the cellular network comprising at least two radio access networks, the primary base node and the secondary base node being assigned to different radio access networks, the primary base node being the base node the user equipment is camping on in non-connected mode, the secondary base node being a candidate base node evaluated by at least one of the user equipment or the cellular network as suited for serving the user equipment, for setting up a communication link to the remote terminal the method comprising the step for the user equipment of:

sending a first capability message comprising available capabilities of the user equipment to the primary base node, receiving a first indication from the primary base node relating to the capabilities indicated as being used by the primary base node, hereinafter the used capabilities, sending a second capability message to the secondary base node, comprising at most those capabilities not indicated as being used by the primary base node, receiving a second indication from the secondary base node relating to the capabilities indicated as being used by the secondary base node, sending a third capability message with still unused capabilities to the primary base node, initiating the communication link by means of the primary and the secondary base node using said configured capabilities.

The proposed method relates to user equipment operating in a cellular network for wireless communication. The cellular network is preferably supporting technology standards including those beyond present 4G standard, in particular 5G resp. New Radio (NR). The cellular network comprises at least two radio access networks (RANs) each supporting different technology standards.

Each radio access network comprises at least one base node, preferably called eNodeB in 4G/5G. The base node represents the air interface to the user equipment situated in the cell area covered by a base node.

Each base node is configured to signal on at least one frequency band for downlink communication.

A user equipment is camping in non-connected mode on one base node, this is hereinafter the primary base node. The primary base node mainly controls the handling of camping user equipments and the communication link when it is set-up.

The user equipment is capable of maintaining a communication link by means of at least two base nodes, the primary base node and at least one other base node of another radio access network than the primary base node. The latter base node is hereinafter called the secondary base node. The communication link is operating comparable to carrier aggregation mechanisms, though operating in different radio access networks. Carrier aggregation like communication means the communication link transmits data packets distributed via the direct connections between the user equipment and the primary base node and between the user equipment and the at least one secondary base node.

The inventive method relates in a first approach to setting up the communication link to a remote terminal. The remote terminal being another user equipment or a server or device in the internet or on other ways connected to the cellular network.

Before setting up the communication link the user equipment camps on the primary base node. Further the user equipment identified at least one candidate base node as secondary base node. This is in particular done by measuring signals, in particular broadcast channels, for determining if the base node is sufficiently suited for operating with it, and in particular better suited than other detectable base nodes.

Alternatively it is proposed that the primary base node sends an indication relating to a matching secondary base node. However this will not suffice alone, when the identified candidate base node is not suitable in terms of reception quality.

When the communication link is about to be set up from the user equipment, it starts with sending a first capability message from the user equipment to the primary base node. The capability message comprises information relating to available capabilities of the user equipment.

Preferably the capabilities relate to a resource allocation relating to a supported band combination of at least one of the primary and secondary base node.

Consequently the first capability message is intended to have the primary base node decide about a reservation of the reported capabilities. Hence, in response the primary base node sends a message to the user equipment comprising a first indication relating to the used capabilities.

Such message from the primary base node may either indicate which of the capabilities provided with the first capability message are allocated by the primary base node or the message indicates which of the provided capabilities are not allocated by the primary base node.

Upon reception of the message from the primary base node the user equipment determines the remaining unused capabilities. With the second capability message to the candidate base node which is identified as secondary base node it is informed about the capabilities that are not in use.

Preferably the first and the second capability message comprises only those capabilities that are applicable to the respective base node. If a base node is not configured to support certain band combinations, and the user equipment is aware of, e.g. through receiving system information blocks, then it is advantageous not to provide such capabilities with the first or second capability message as the addressed base node will not be able to allocate it.

The secondary base node will then pick from the indicated unused capabilities preferably a subset. This is in particular depending upon other tasks for other user equipments the base node has to serve.

The secondary base node consequently sends a message to the user equipment indicating the used capabilities, resp. which capabilities are not used.

The last steps are preferably repeated for the case of more than one secondary base node.

After receiving the second indication at the user equipment the secondary base node and the user equipment are aware of the unused capabilities of the user equipment. In order to also provide the primary base node with the relevant information relating to the unused capabilities, the user equipment sends a third capability message indicating the still unused capabilities to the primary base node. With that all involved parties are on the same side and have the same information.

Consequently then the communication link can be set up by means of the primary and secondary base node, according to the reserved capabilities.

Such communication link is using carrier aggregation by distributing the packet transmission over the involved base nodes, taking into account which resource allocations are carried out per base node.

The proposed method is apparently advantageous as for setting up the communication link no direct interaction between the primary and secondary base node is needed. The user equipment controls the steps of setting up and distributes the necessary information. This relieves the cellular network from internal network traffic. Further the interface between base nodes of different radio access networks remains manageable.

This is in particular advantageous for the case that base nodes supporting other wireless technologies like Wifi, Wimax, . . . are supposed to be integrated in the cellular network architecture, as it is foreseen for 5G networks. It would not be manageable to define full interfaces for carrier aggregation over a plurality of technology standard combination.

According to another preferred embodiment it is proposed the method further comprising the steps for a user equipment upon reception of an allocation change request from the primary base node during an active connection:

determining in response to the allocation change request the change in available capabilities, sending a reallocation confirmation message to the primary base node, sending a capability message indicating the remaining capabilities to the secondary base node.

This advantageous embodiment relates to a reallocation of capabilities after the communication link is set up according to the previous embodiment.

When the primary base node detects the need for an allocation change, in particular due to internal reconfiguration, resource assignment to other user equipments or something else, then it will inform the user equipment about the need for an allocation change. This is the starting point of this method for the user equipment. Preferably the allocation change message relates to additional capabilities to be assigned to the requesting base node. Alternatively the requesting base node informs the user equipment about released capabilities, that cannot be served anymore during the pending communication link.

Hence, when receiving the allocation change message, the user equipment determines if it is able to comply with the requested allocation change. In case of released capabilities this is generally possible. In case of additional requested capabilities this requires mainly a sanity check if the request does not exceed the by now unused resources.

The result of this determination step is sent as a confirmation message to the primary base node and carries out the allocation change.

If the confirmation is positive, then the user equipment determines in response to the allocation change message if the requested unused capabilities are still available. The unused capabilities are effectively changed by this, in particular the number is reduced.

In another capability message the secondary base node is then informed by the user equipment about the change in unused capabilities. Should the secondary base node want to carry out an allocation change, then it is now in the position to estimate to what extent the user equipment is able to provide the requested resources.

Generally this embodiment is also applicable to the secondary base node, that is, if the need for an allocation change is detected at the secondary base node, the same method steps are carried out. According to another embodiment it is further suggested that after sending the capability message to the secondary base node:

receiving an indication from the secondary base node relating to resource allocation change, changing resource allocation based on said allocation request and said resource allocation change indication.

According to this embodiment the need for an allocation change is triggered by the user equipment by sending the capability message to the secondary base node after receiving the allocation change request from the primary base node.

Consequently the user equipment further sends a capability message indicating the remaining capabilities to the primary base node.

After that the user equipment and the base nodes involved in the communication link are all informed about the now updated unused capabilities of the user equipment.

According to another advantageous embodiment of the inventive method it is further proposed a method comprising the step of:

evaluating the radio conditions at least of the primary base node, initiating to change the primary base node assignment to the secondary base node in response to the detection of a reduction of the radio conditions below a predetermined threshold.

This embodiment relates to the situation that the primary base node is for the user equipment not suitable any more, that means the radio conditions are degrading that way, that no reliable communication is possible anymore.

When the radio conditions are below a predetermined threshold, then the user equipment decides to switch the assignment of primary base node and secondary base node. In other words: one of the secondary base nodes involved in the communication link will get the primary base node. The by now primary base node will then become the secondary base node.

With that it is assured that the user equipment has a primary base node assigned, as long as it is in the coverage area of a base node of the used cellular network.

By now the allocation of capabilities remains unchanged. For handling the situation if the radio conditions are further degraded it is proposed another embodiment comprising the step of:

in response to detection of a radio link drop of at least one of the secondary base nodes, sending a reception warning message to the primary base node indicating that radio link drop of the secondary base node active in the communication at the user equipment.

When the radio conditions further degrade such that a radio link drop to one of the secondary base nodes is detected, then the user equipment is aware of the fact that the secondary base node cannot be used anymore. As the primary base node is basically controlling the communication link, it needs to be informed about the radio link drop to the secondary base node.

Therefore the user equipment sends an message to the primary base node indicating the radio link drop to the secondary base node. Together with that information the user equipment preferably sends an indication about the capabilities which were assigned to the dropped secondary base node. With that the capabilities could be assigned to the primary base node, at least as long as no suited secondary base node is available.

Alternatively the user equipment only sends the radio drop message and as soon as a suitable secondary base node is identified send a capability message with unused resource including those from the previous secondary base node to the new secondary base node. Preferable the user equipment selects—alone or with support from the primary base node—another secondary base node, and consequently sends with said capability message the unused capabilities, including those originally assigned to the previous secondary base node, to the new secondary base node.

This embodiment is applicable for both situations of a secondary base node which was a primary base node before, or of a base node which acted as secondary base node from the beginning of the communication link.

According to a second aspect of the invention it is proposed a user equipment configured to communicate with a remote terminal by means of a primary base node and at least one secondary base node of a cellular network in parallel, the cellular network comprising at least two radio access networks, the primary base node and the secondary base node being assigned to different radio access networks, the primary base node being the base node the user equipment is camping on in non-connected mode, the secondary base node being a candidate base node chosen by at least one of the user equipment or the cellular network as suited for serving the user equipment, for setting up a communication link, the user equipment is configured to:

send a first capability message comprising available capabilities of the user equipment to the primary base node, receive a first indication from the primary base node of used capabilities, send a second capability message to the secondary base node, comprising only those capabilities not indicated as being used by primary base node, receive a second indication from the secondary base node of used capabilities, send a third capability message with still unused capabilities to the primary base node, initiate setting up the communication link by means of the primary and the secondary base node using said configured capabilities.

The user equipment according to this aspect of the invention preferably comprises processing circuitry, volatile and permanent memory and transceiver circuitry. Preferably the user equipment includes a communication unit comprising the transceiver circuitry and a separate processor for handling the tasks relating to the wireless communication with a base node. In a further processing circuitry the operating computer software, preferably stored in the permanent memory, of the user equipment is executed. Said user equipment is in particular a machine type communication (MTC) device The user equipment is configured by means of the processing circuitry, transceiver circuitry and/or memory to operate in a connection session for setting up a communication link to a remote terminal with a primary base node and at least one secondary base node.

The second aspect of the invention shares the advantages of the first aspect of the invention.

According to a third aspect of the invention it is suggested a method for handling at least one user equipment in a cellular network comprising at least two radio access networks, and at least two base nodes being assigned to different radio access networks, wherein one of the at least two base node is a primary base node and another of the at least two base nodes is the secondary base node, the primary base node being the base node said user equipment is camping on in non-connected mode, the primary base node being the base node the user equipment is camping on in non-connected mode, the secondary base node being a candidate base node chosen by at least one of the user equipment or the cellular network as suited for serving the user equipment, the method comprising the steps for the primary base node of:

receiving a capability message comprising available capabilities of the user equipment, determining the used capabilities of the available capabilities, sending a message to the user equipment indicating the determined used capabilities, receiving a third capability message comprising still unused capabilities, serving the user equipment in a setup communication link with the indicated capabilities.

The method according to the third aspect relates to a base node of a cellular network. The base node being part of one of at least two radio access networks of the cellular network. The base node is configured to signal on at least one frequency band for downlink or uplink communication.

The base node is a primary base node in relation to a user equipment camping on said base node and using at least one additional base node, called the secondary base node, for handling a communication link to a remote terminal in carrier aggregation.

From the perspective of the primary base node the method for setting up the communication link comprises receiving a capability message from the user equipment. The capability message comprises information relating to the available unused capabilities of the user equipment, in particular resource allocations relating to supported band combinations.

With that the primary base node has the choice which resp. what amount of capabilities to choose for the next communication link. For the determination about the used capabilities, that is the capabilities that are to be allocated to the primary base node, the primary base node in particular considers the indicated available capabilities and also the traffic resp. resource situation of the primary base node.

In case the primary base node knows which secondary base node is used for the envisaged communication link, the primary base node preferably further takes into account the abilities of the secondary base node. This relates preferably to overlapping resources, so the primary base node preferably avoids such resources, when it has other and the secondary base node not, at least not much.

The primary base node then sends a message to the user equipment indicating the determined reserved resources, and assumes to continue with the indicated resources.

Then the primary base node receives another capability message which is the third capability message from the first aspect of the invention. This capability message indicates the still unused resources, that remain after the secondary base node meanwhile reserved some capabilities. The primary base node memorizes this indicated information for the case of a later allocation change during the communication session.

Then the primary base node serves the user equipment for setting up the communication link, by means of the picked capabilities.

According to an advantageous embodiment it is proposed a method wherein a communication link between a user equipment and a remote terminal by means of the primary base node and at least one secondary base node is active, the method further comprising the step for at least one out of the primary base node and the secondary base node of:
  detecting the need for a reallocation change to the user equipment,
  sending a stay allocation message to at least one of the other base nodes active in the communication link,
  sending an allocation change message to the user equipment,
  receiving a reallocation confirmation message from the user equipment.

This embodiment relates to the situation of an active communication link of the user equipment with a remote terminal by means of said primary base node and at least one secondary base node. The method becomes active when the primary base node detects the need for an allocation change to the user equipment. There might be various reasons for such allocation change, including base node resp. network internal reasons.

When this need is detected, in particular an increase of used capabilities of the user equipment is envisaged, then the primary base node refers to the memorized information about unused capabilities of the user equipment. In case unused capabilities are available, then the primary base node may proceed.

As a first step the primary base node sends a stay allocation message to the at least one other secondary base nodes of the active communication link. Such stay allocation message informs the other involved secondary base nodes about the fact that said primary base node is now about to request an allocation change from the user equipment. Preferably the message between the base nodes is carried out via an interface connecting base nodes, in particular the X2 interface or a replacement in new technology standards.

By that the secondary base node is informed that another base node involved in the communication link will now request an allocation request. Thus collisions are avoided between multiple base nodes involved in a communication link.

After the stay allocation message the primary base node sends the allocation request message to the user equipment and preferably receives an reallocation message from the user equipment indicating that the allocation request was confirmed, if so.

On occasion of the primary base node trying to perform an allocation change, for the secondary base node it is proposed a method comprising the steps,
  upon reception of a stay allocation message from the primary base node, suppressing allocation changes,
  receiving from the user equipment a capability message indicating available capabilities,
  sending a completion message indicating that the stay phase is ended to the primary base node.

This embodiment relates to the part of the secondary base node in the case of a reallocation initiated by the primary base node.

The secondary base node receives a stay allocation message from the primary base node, typically when the primary base node—as described before—wants to effect a allocation change.

Upon reception of such a stay allocation message the secondary base node refrains from initiating an allocation change. This behavior assures that no colliding allocation change requests are sent to the user equipment by more than one base node involved in the communication link.

This status remains active until the secondary base node receives an indication about the successful completion of the allocation change of the primary base node. This is in particular the case by receiving a capability message from the user equipment indicating unused resources after the allocation change relating to the primary base node was carried out. This tells the secondary base node that the allocation change is finished, and about the amount of unused capabilities after the allocation change. Hence allocation changes initiated by the secondary base node could be carried out now.

For confirming that the stay phase has ended, the secondary base node sends a stay complete message to the primary base node.

Preferably, in case the secondary base node wants to change the allocation, the stay complete command further comprises a stay allocation command for the primary base node.

Consequently the secondary base node in that case continues with the allocation method steps as set out before. Otherwise the allocation change from the primary base node is than completed, and no other allocation changes are due.

As it can be seen, with still a remarkably low amount of messages between the base nodes involved in the communication link not only the setting up of the communication link, but also changes of allocation can be carried out with maintained transaction security, that is by avoiding collisions.

Should the primary base node and the secondary base node at the same time sent stay allocation messages to teach other, it is suggested to resolve this issue with a priority for the primary base node. In that case the primary base node would send a stay rejected message to the secondary base node together, e.g. by sending another stay allocation message to the secondary base node.

In another preferred embodiment it is proposed a method comprising the step for the primary base node of:
receiving an reception warning message from the user equipment indicating that for a first secondary base nodes active in the communication link the reception conditions at the user equipment are below a predetermined threshold,
determining a second secondary base node suited for serving the user equipment,
sending a free capability message to the first secondary base node, instructing to release the selected capabilities of the user equipment,
sending a response message to the user equipment informing about the released capabilities, and
recommending the second secondary base node to the user equipment.

This method relates to the situation that the user equipment is leaving the cell area of a first secondary base node during an active communication link. In that case the primary base node receives from the user equipment a warning message indicating that for the first secondary base node the connection cannot be continued.

That means, the user equipment wants to stop working with the first secondary base node, and continues with another secondary base node. As there are still resources assigned to the first secondary base node, the user equipment needs support from the primary base node.

Hence the primary base node upon reception of the warning message sends a free capability message to the first secondary base node. With that the first secondary base node is informed about the connection loss to the user equipment and therefore releases the allocation resources. Preferably the first secondary base node confirms the release of the resources to the primary base node.

In that situation the user equipment is not able to interact with the secondary base node anymore, as the connection loss is assumed to be apply both directions of the interaction. Therefore it is advantageous that the primary base node takes this part.

The user equipment is informed about that fact by another message from the primary base node. Preferably the primary base node further recommends another secondary base node to the user equipment. Such a recommendation in particular is provided by the cellular network, respectively the core network or the mobility management entity (MME). This is advantageous as in the cellular network the relevant information are in typical cases available.

The user equipment then sends a capability message including the unused capabilities, including those previously assigned to the first secondary base node to the other secondary base node. The other secondary base node confirms the change by indicating in response the reserved capabilities to the user equipment.

After the change of secondary base nodes is carried out, packet forwarding from the first to the second secondary base node is carried out, according to methods known from carrier aggregation.

This embodiment is only applicable for radio connection loss of a secondary base node, consequently only the primary base node is entitled to send a free command to the secondary base node. In case the radio conditions of the primary base node are below a predetermined threshold, it is the user equipment, as described above, which initiates to switch primary and secondary base node assignment. The user equipment then continues with the new configuration to find a new secondary base node according to the embodiment described before.

According to a fourth aspect of the invention it is proposed a cellular network for operating at least one user equipment, the cellular network comprising at least two radio access networks, and at least two base nodes being assigned to different radio access networks, wherein one of the at least two base node is a primary base node and another of the at least two base nodes is the secondary base node, the primary base node being the base node said user equipment is camping on in non-connected mode, the primary base node being the base node the user equipment is camping on in non-connected mode, the secondary base node being a candidate base node chosen by at least one of the user equipment or the cellular network as suited for serving the user equipment, wherein the primary base node is configured to:
receive a capability message comprising available capabilities of the user equipment,
determine the usable capabilities of the available capabilities,
send a message to the user equipment indicating the determined usable capabilities,
receive a third capability message comprising still unused capabilities,
send a message to the user equipment indicating additionally usable capabilities of said unused capabilities,
serve the user equipment in a setup communication link with the indicated capabilities.

The cellular network is preferably supporting a technology standard of and beyond 4G/LTE. The base node is preferably an eNodeB. The cellular network comprises a plurality of base nodes each serving a cell area, and thus covering the coverage area of the cellular network. The base node preferably comprises processing circuitry, volatile and permanent memory, transceiver circuitry and an antenna. The permanent memory holds computer programs for controlling the base node, which are executed at the processing circuitry. The base node is further connected to other components of the cellular network, in particular wired, and in particular to components of the radio access network, like the MME.

The fourth aspect of the invention shares the advantages of the third aspect.

As it is shown this invention advantageously solves the depicted problem and proposes a solution for inter-RAN carrier aggregation by still reducing the management efforts for the network components, in particular the involved base nodes of different technology standards. That reduces administration in particular specification requirements and simplifies by complying with a low set of inter-base node commands.

BRIEF DESCRIPTION OF THE DRAWINGS

The following description and the annexed drawings set forth in detail certain illustrative aspects and are indicative of but a few of the various ways in which the principles of the embodiments may be employed. Characteristics and advantages of the present invention will appear when reading the following description and annexed drawings of advantageous embodiments given as illustrative but not restrictive examples.

FIG. 1 schematically shows an embodiment of the apparatuses of present invention. The user equipment UE is configured to operate in a cellular network CLN by means of at least one base node BS.

Figure 1:
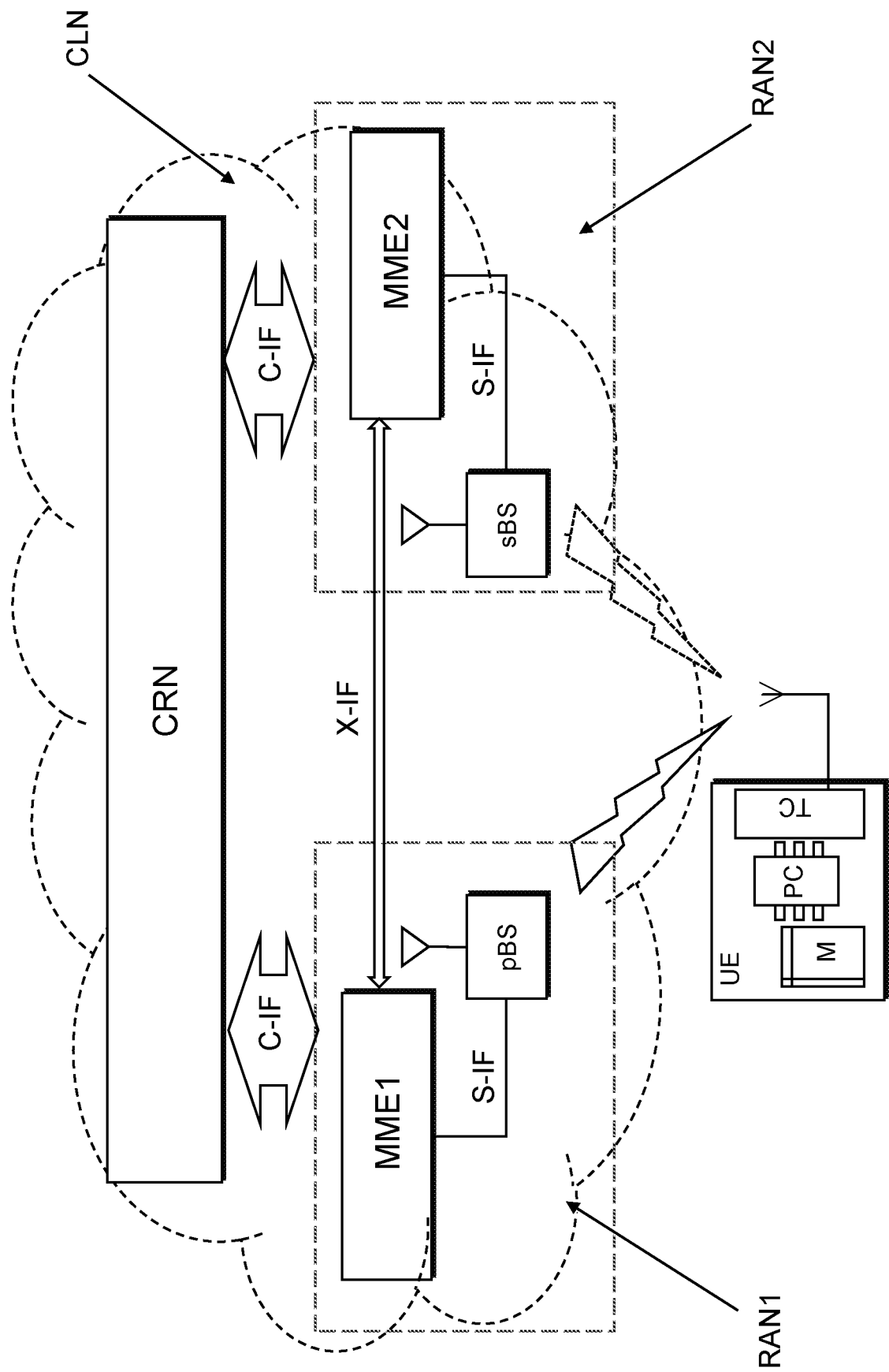
FIG. 1 represents the architecture of the apparatuses to which the present invention is applied to as an embodiment.

The user equipment UE of this embodiment comprises processor circuitry PC, like a CPU or other types of processors. The processor is configured to execute computer programs which are stored in the memory M of the user equipment. The processor is at least dedicated for controlling the transceiver circuitry TC.

The transceiver circuitry comprises both receiver circuitry and transmitter circuitry for wireless communication with at least one base node of a cellular network. For this it additionally makes use of the antenna AN. In alternative embodiments transceiver and receiver circuitry are separate components of the user equipment UE.

The exemplifying cellular network CLN preferably supports a plurality of technology standards including 4G/LTE, 5G resp. New Radio (NR).

The cellular network CLN at least comprises a plurality of base nodes each covering a cell area of the coverage region. The base nodes are connected to at least one cellular network component, which is the control node for managing the access between base node and core network CRN.

The base nodes each are dedicated to support one respective technology standard, typically base nodes of technology standards LTE and beyond are called eNodeBs.

The base nodes are connected to at least one cellular network component, which is the control node for managing the access between base node and core network CRN, as in the exemplifying embodiment the mobile management entity MME. Base nodes of different radio access networks RAN1, RAN2 are typically connected to different mobile management entities MME1, MME2.

The user equipment UE is generally camping on one base node, which is called the primary base node pBS. The camping relationship is indicated with the solid line lightning. The user equipment is preferably camping on the base node with the best signalling connection, and that provides the requested network services. E.g. for a high data throughput device (hDTD) a base node of higher technical standard is preferably selected.

Such high data throughput devices it is further configured to use for a data transmission session more than one base node. In LTE such method is called carrier aggregation. However in LTE the base nodes are operating in the same radio access network RAN, and even more mostly on the same MME. Therefore coordination of the carrier aggregation based data transmission session is easily carried out by the radio access network.

In the depicted scenario however a data transmission session which is supposed to use the primary base node of the first radio access network RAN1 and another base node, hereinafter the secondary base node sBS, of another radio access network RAN2 needs to be organized differently. The relationship to the secondary base node is indicated with the dashed line lightning.

For organizing the collaboration the primary base node pBS and the secondary base node sBS communicate with each other over an interface X-IF, which is in the present exemplifying embodiment connecting the mobile management entities MME1, MME2. Alternatively the respective entities of the core network CRN are responsible for the co-ordination. Alternatively a direct interface between the base nodes may be there as well, in this case preferably an X2-like interface connecting here base nodes of different technology standards.

Nevertheless, the interface X-IF is supposed to be very thin, one the one hand due to the signalling overhead within the cellular network, on the other hand in order to reduce interface specification efforts, as the inventive method is dedicated to be applicable to a plurality of interacting radio access networks. It is important to note that the X2 or X-IF may also only be a logical interface whereby the physical interface itself is realized by the existing interface via respective core network elements.

Further the mobile management entities MME1, MME2 preferably are communicating each via the core interface C-IF with the core network CRN of the cellular network CLN. This applies at least as long the base nodes belong to the same network. The base nodes are connected to the MMEs preferably by means of the S1-interface S-IF.

In other scenarios base nodes may communicate via network gateways with the cellular network, e.g. when one base node belongs to local area networks, like Wifi, Wimax etc. The inventive method is not limited to known cellular networks.

Figure 2:
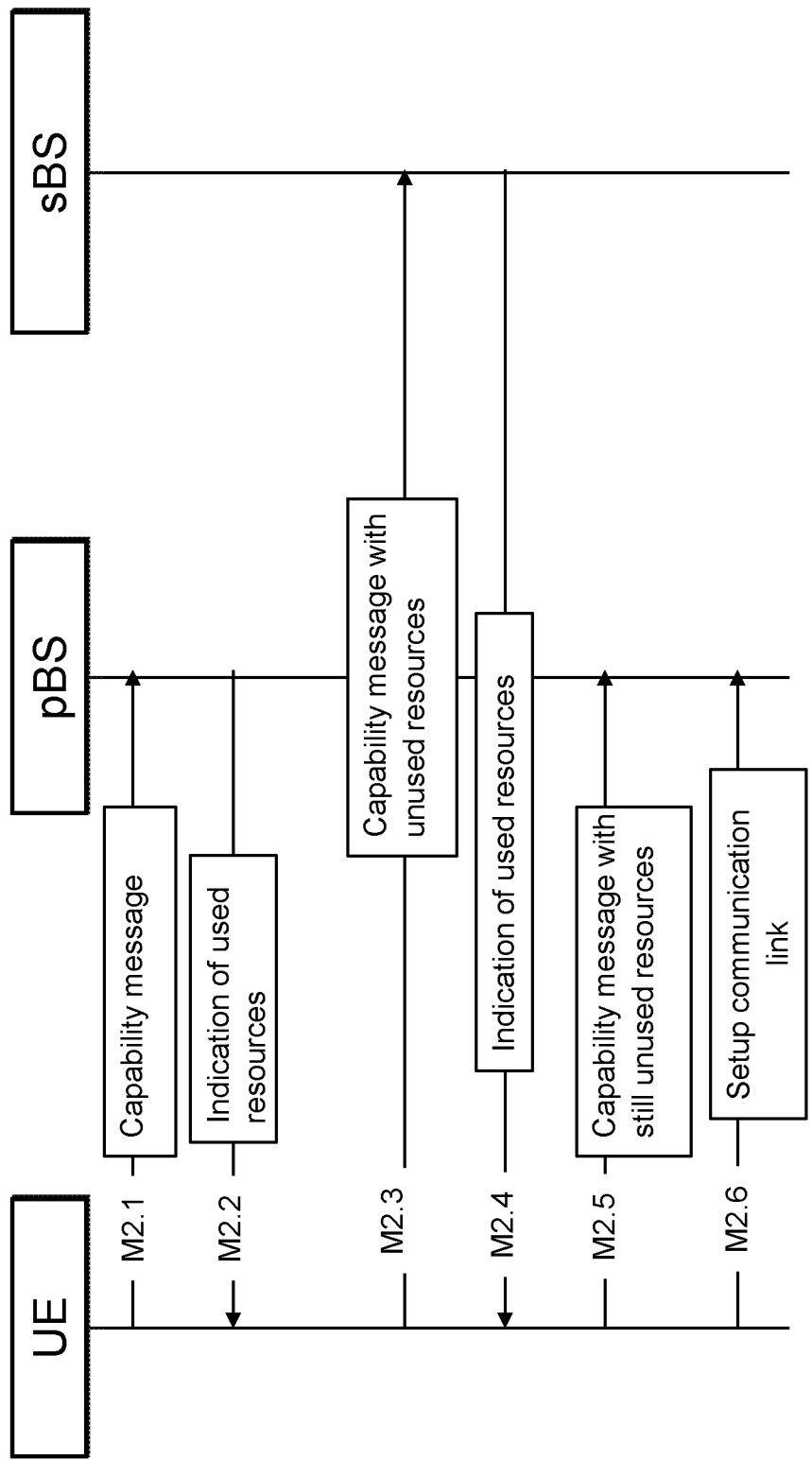
FIG. 2 shows a first sequence diagram of an exemplifying embodiment of the inventive method.

For setting up a data transmission session with a primary base node and at least one secondary base node the steps depicted in FIG. 2 are carried out according to another exemplifying embodiment.

The sequence diagram starts with the user equipment camping on the primary base node in a non-connected mode, preferably idle mode. The user equipment is supposed to set up a data transmission session, whereby an uplink data transmission, a downlink data transmission or a combination of both is foreseen. Preferably the user equipment is aware of that the data transmission is best handled with carrier aggregation, that means via two base nodes. The following exemplifying sequence flow assumes that a primary base node and one secondary base node is involved in the data transmission session. Data transmission sessions with more than one secondary base nodes are further encompassed by the invention.

At one point in time before setting up the data transmission the user equipment sends a capability message M2.1 to the primary base node. The capability message M2.1 comprises information about which capabilities, in particular relating to the possible resource allocation and/or supported band combinations the user equipment provides. The invention also applies to soft channel bits and decision making of sharing other resources. For the present exemplifying embodiment it is assumed that the capabilities comprise the supported band combination.

The primary base node determines based on the received capability message, which of the resources it is capable to allocate and if due to congestion issues the primary base node may not be able to fully serve the user equipment.

Consequently the primary base node sends with message M2.2 an indication about used resp. reserved resources for the next data transmission session to the user equipment.

The user equipment evaluates the received message and is then looking for a secondary base node sBS, in order to allocate as much as possible from the by now unused capabilities.

There are at least two options how to identify the secondary base node. Preferably the primary base node sends with the resource indication message M2.2 a recommendation for a secondary base node nearby. Alternatively the user equipment figures out through own suitability measurements what secondary base nodes are suited best for being used for the envisaged data transmission session.

In case the primary base node pBS recommends a secondary base node, then it may know which resources the secondary base node sBS is able to address. Based on this knowledge the primary base node advantageously decides to choose its resources for its own that way that it does not interfere with possible resource allocation of the secondary base node. In particular in case of overlapping recourses supported both by the primary and the secondary base nodes the primary base node could favour the non-overlapping resources, if available on both sides.

After receiving the message from the primary base node the user equipment sends to the selected secondary base node the message M2.3 comprising indications about by now still unused capabilities of the user equipment. By that the secondary base node is in the position to identify which of the capabilities resp. resources it is able to serve.

Once the secondary base node decided which resources to allocate, the used resources are consequently transmitted in message M2.4 to the user equipment.

By now the user equipment has the information which of its capabilities are used for the next data transmission session, and which are not. This information may also be derived by the secondary base node.

For making the primary base node aware of the unused capabilities the user equipment after receiving message M2.4 from the secondary base node sends another message M2.5 to the primary base node indicating the still unused resources. Preferably, if not already known, with message M2.5 the primary base node is additionally informed about the one or more secondary base nodes involved in the communication link.

After the depicted steps the user equipment UE in conjunction with the primary base node sets up the communication link for the data transmission session, then also involving the secondary base node sBS.

Figure 3:
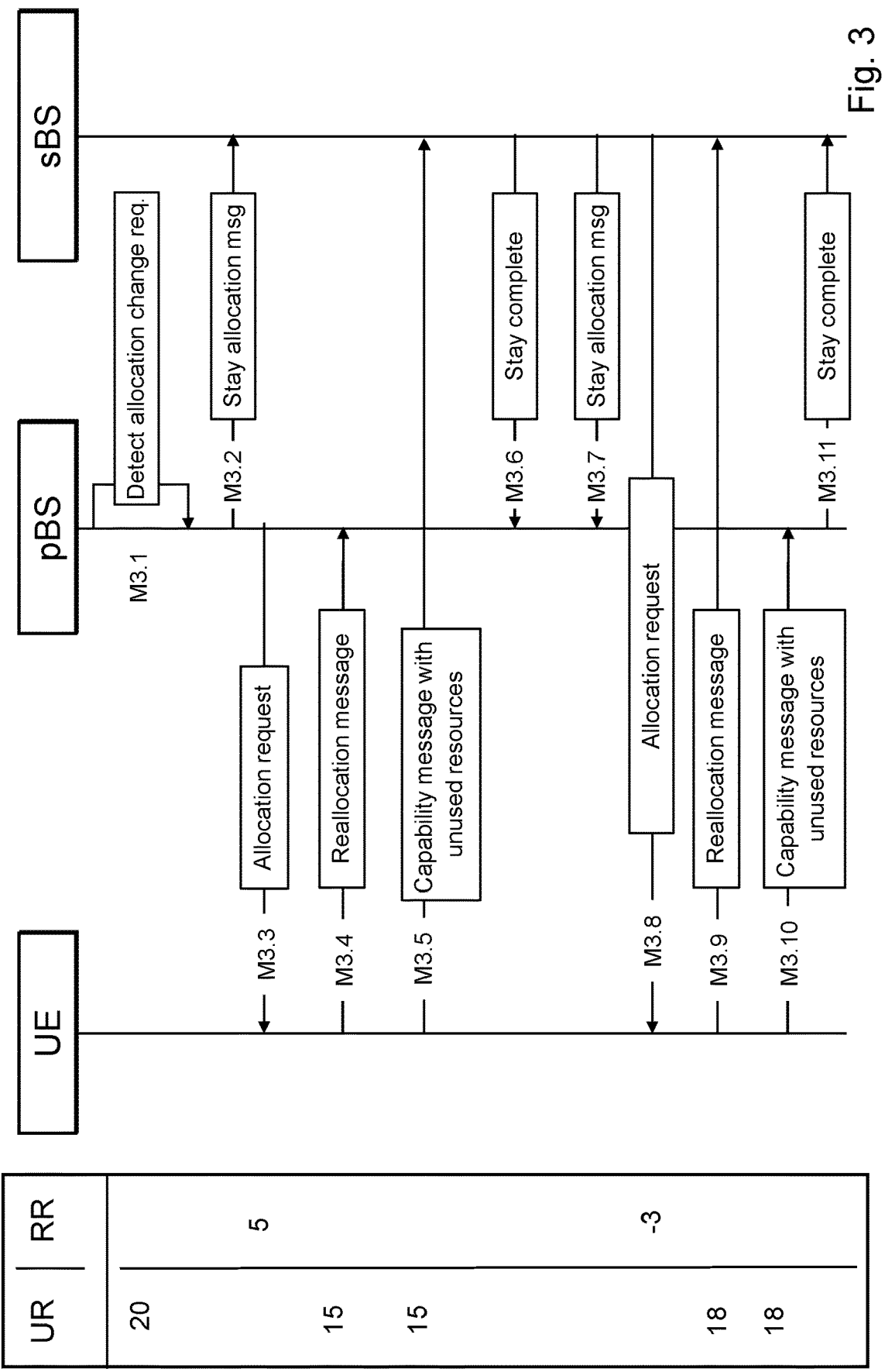
FIG. 3 represents a second sequence diagram of an exemplifying embodiment of the inventive method.

Why it is important for the base nodes to know the unused resources of the user equipment is shown in FIG. 3 which shows the situation in case of an allocation change at the primary base node. Generally this could also happen at the secondary base node.

The affected base node needs to know, if such additional capabilities are still available when an allocation change, in particular relating to the possibility to assign additional resources to the respective data transmission session, is due.

The process for doing so starts with the internal message M3.1, in the shown example at the primary base node. Here it is detected that an allocation change may be possible or needed. This determination may have various reasons. One reason is that resources of the base node are freed from other connections with other user equipments.

In the resource usage box on the left side it is for illustration purposes indicated as usable resources (UR) that 20 resource units are available, without necessarily specifying what kind of resources are meant by this unit number.

Before the primary base node accesses the user equipment, first a stay allocation message M3.2 is sent to the at least on secondary base node. With this message the secondary base node is instructed to refrain from requesting an allocation change from the user equipment until informed differently. This is the first message in the whole workflow between one of the base nodes. To avoid collisions between requests from both base nodes, in a way of transaction security like measure, this stay allocation message is a mandatory message before sending an allocation request. Preferably the secondary base node confirms the reception of the stay allocation message. Once in that stay allocation phase, the secondary base node suppresses potential allocation changes. Possible collisions of both base nodes requesting a stay to each other in parallel are solved among the base nodes, preferably the primary base node has priority.

After successfully sending the stay allocation message the primary base node then sends an allocation request M.3.3 to the user equipment. Preferably the allocation request relates to an increase of allocated resources of the user equipment. For that the primary base node takes into account the amount of unused resources it knows from the message M2.5 (see FIG. 2) retrieved on occasion of the setup procedure. In this case the primary base node is aware of 20 unused resource units at the user equipment, and consequently can ask for another 5 reserved resource units RR. Alternatively also the allocation request relates to a reduction of allocated resources. For this example the primary base node however intends to increase the used resources of the user equipment.

The user equipment UE checks the request and if available—as shown here
  responds to the requesting primary base node with a reallocation message M3.4, wherein the allocation request is—at least partly—confirmed. As a result the number of unused resource units is reduced by 5, indicating that the complete set of requested resource units was confirmed with message M3.4.

Additionally the user equipment sends to the at least one secondary base node a capability message M3.5 with unused resources. With that the secondary base node is informed about the new number of unused resources of the user equipment—in this case 15 unused resource units UR. With the same message the secondary base node gets the information that the reallocation of the primary base node has completed. As still the stay allocation phase is active, this informs the secondary base node about the end of the stay allocation.

The secondary base node then sends a stay complete message M3.6 to the primary base node for informing also the primary base node about the end of the stay allocation phase. Alternatively it is proposed that the primary base node sends a stay complete message after the reallocation message was retrieved from the user equipment, but that would require an additional message type among the base nodes.

In this example the secondary base node after receiving the capability message M3.5 evaluates an allocation change.

It then decides for an allocation change. This might comprise both additional resources or releasing of resources. In this case the secondary base nodes decides to release 3 resource units.

In any case for indicating an allocation change the same workflow as before at the primary base node needs to be fulfilled. So it starts with a stay allocation message M.3.7 to the primary base node. With that the primary base node is informed to refrain from requesting allocation for its part. Optionally the stay allocation message M3.7 is sent together with the stay complete message M3.6 in order to save signalling resources in the cellular network.

Then the allocation request M3.8 is sent from the secondary base node to the user equipment UE, here indicating a reduction of allocated resource unit by 3.

The user equipment handles the new allocation request the same way as before, that is it checks the allocation requested and in case of a positive outcome sends a reallocation message M3.9 to the secondary base node.

It further updates the number of unused resource units, in this case an increase to 18. Further the capability message with unused resources M3.10 is sent to the primary base node pBS.

The primary base node then sends the stay complete message M3.11 to the secondary base node.

Receiving the capability message M3.10 could again be handled as allocation change which is checked in internal message M3.1. Nonetheless such changes may happen a while later in order to maintain a stable resource allocation status. This is in particular desirable for a user equipment which is operated stationary.

Figure 4:
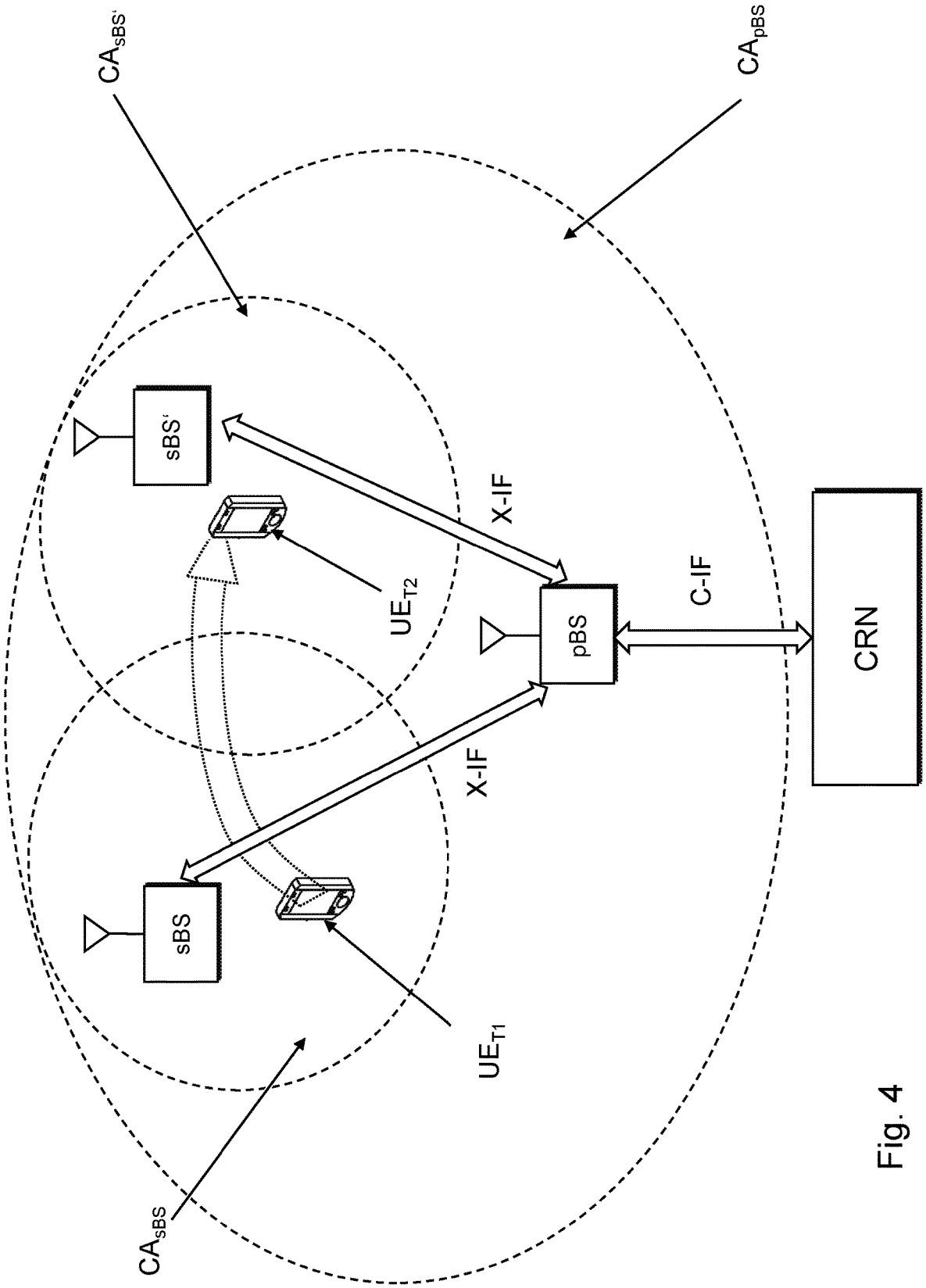
FIG. 4 shows the situation of a user equipment operating in a cellular network according to an exemplifying embodiment of the inventive method.

FIG. 4 shows in an additional exemplifying the situation for a user equipment which is moving. This might in particular relate to a car with a connected entertainment unit etc.

In FIG. 4 it is shown a user equipment $UE_{T1}$ at a first point in time. The user equipment is situated in the cell area $CA_{pBS}$ of the primary base node pBS, where it is camping on. Additionally the user equipment is situated in the cell area $CA_{sBS}$ of the secondary base node sBS.

Primary base node pBS and secondary base node sBS are part of different radio access networks of a cellular network. They can communicate over a cellular network internal interface X-IF. It is preferable to reduce the traffic on such cross-RAN interface.

Further the primary base node is connected to the core network CRN, via the core-interface CRN.

The user equipment is operating in a connection link with carrier aggregation using the primary base node pBS and the secondary base node sBS.

After setting up the communication link the user equipment is moving and then the situation appears where the user equipment is at position $UE_{T2}$. The user equipment is then situated in the cell area $CA_{sBS'}$ of another base node sBS'. This other base node is also linked to the primary base node by means of the cellular network interface X-IF.

As it can be seen the user equipment is not anymore situated in the cell area $CA_{sBS}$ of the secondary base node sBS that was used for the communication link. The user equipment UE is capable of detecting that it is unable to decode signals from the secondary base node sBS.

In such situation at least the following tasks are to be fulfilled:
identify a new secondary base node for continuing the communication link in carrier aggregation.
assign the allocated resources of the original secondary base node sBS to the newly identified secondary base node.

According to advantageous embodiments of present invention this is preferably solved the following way:

The user equipment informs the primary base node pBS about the connection lost to the original secondary base node. Preferably in conjunction with the core network CRN the primary base node now identifies the other base node sBS' as new secondary base node.

The primary base node then sends a free resources message to the original secondary base node sBS via the interface X-IF. With this the secondary base node sBS is instructed to free all resources of the user equipment. This is the second type of message between the base nodes of different RANs. Preferably the secondary base node confirms that the resources are freed.

Further the user equipment is informed about the freed resources and the new secondary base node sBS'. With a capability message comparable to message M2.3 (FIG. 2) the user equipment can then contact the base node sBS', information about the unused capabilities, including those freed by the original secondary base node. In response the base node sBS' sends an indication of reserved capabilities and the user equipment sends this information to the primary base node.

Further the packet forwarding of the packets already assigned to the original secondary base node needs to be resolved. For this measures known from the common intra-RAT carrier aggregation mechanism can be reused, as the other secondary base node sBS' is part of the same RAN as the original secondary base node sBS.

After these steps are carried out the user equipment is in a connection link with a primary and a secondary base node, each of the base nodes has resources assigned and knows about unused resources of the user equipments.

Should the cell area of the primary base node be left, then the user equipment UE will assign the primary base node qualification to the remaining secondary base node, and in conjunction with the now primary base node a new secondary base node is determined.

In the above detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The above detailed description is, therefore, not to be taken in a limiting sense, and the scope of the present invention is defined only by the appended claims, appropriately interpreted, along with the full range of equivalents to which the claims are entitled.

The invention claimed is:

1. Method for operating a user equipment communicating in parallel by means of a primary base node and at least one secondary base node of a cellular network with a remote terminal, the cellular network comprising at least two radio access networks, the primary base node and the secondary base node being assigned to different radio access networks, the primary base node being the base node the user equipment is camping on in non-connected mode, the secondary base node being a candidate base node evaluated by at least one of the user equipment or the cellular network as suited for serving the user equipment, for setting up a communication link to the remote terminal: the method comprising the step for the user equipment of:
- sending a first capability message comprising available capabilities of the user equipment to the primary base node,
- receiving a first indication from the primary base node relating to the capabilities indicated as being used by the primary base node,
- sending a second capability message to the secondary base node, comprising at most those capabilities not indicated as being used by the primary base node,
- receiving a second indication from the secondary base node relating to the capabilities indicated as being used by the secondary base node,
- sending a third capability message with still unused capabilities to the primary base node, and
- initiating the communication link by means of the primary base node using the capabilities indicated as being used by the primary base node, and by means of the secondary base node using the capabilities indicated as being used by the secondary base node.

2. The method according to claim 1,
wherein the capabilities relate to a resource allocation relating to a supported band combination of at least one of the primary base node and secondary base node.

3. The method according to claim 2,
further comprising the steps for the user equipment, upon reception of an allocation change request from the primary base node during an active connection:
- sending a reallocation confirmation message to the primary base node,
- determining in response to the allocation change request the change in available capabilities, and
- sending a capability message indicating the remaining capabilities to the secondary base node.

4. The method according to claim 3,
further comprising the step of, after sending the capability message to the secondary base node:
- receiving an indication from the secondary base node relating to resource allocation change, and
- changing resource allocation based on said allocation request and said resource allocation change indication.

5. The method according to claim 1,
the method comprising the step of:
- evaluating the radio conditions at least of the primary base node, and
- initiating to change the primary base node assignment to the secondary base node in response to the detection of a reduction of the radio conditions below a predetermined threshold.

6. The method according to claim 1,
further comprising the step of:
- in response to detection of a radio link drop of at least one of the secondary base nodes, sending a reception warning message to the primary base node indicating that radio link drop of the secondary base node active in the communication at the user equipment.

7. User equipment configured to communicate with a remote terminal by means of a primary base node and at least one secondary base node of a cellular network in parallel, the cellular network for use with the user equipment comprising at least two radio access networks, the primary base node and the secondary base node being assigned to different radio access networks, the primary base node being the base node the user equipment is camping on in non-connected mode, the secondary base node being a candidate base node chosen by at least one of the user equipment or the cellular network as suited for serving the user equipment,
for setting up a communication link, the user equipment comprises a transmitter/receiver configured to:
- send a first capability message comprising available capabilities of the user equipment to the primary base node,
- receive a first indication from the primary base node of capabilities indicated as being used by the primary base node,
- send a second capability message to the secondary base node, comprising only those capabilities not indicated as being used by primary base node,
- receive a second indication from the secondary base node relating to the capabilities indicated as being used by the secondary base node,
- send a third capability message with still unused capabilities to the primary base node, and
- initiate setting up the communication link by means of the primary base node using the capabilities indicated as being used by the primary base node, and by means of the secondary base node using the capabilities indicated as being used by the secondary base node.

8. The user equipment according to claim 7,
wherein the capabilities relate to a resource allocation relating to a supported band combination of at least one of the primary base node and secondary base node,
the user equipment is, in response to reception of an allocation change request from the primary base node during an active connection, configured to:
- send a reallocation confirmation message to the primary base node,
- determine in response to the allocation change request the change in available capabilities, and
- send a capability message indicating the available capabilities to the secondary base node.

9. The user equipment according to claim 8,
further configured to:
- receive an indication from the secondary base node relating to resource allocation change, and
- change resource allocation based on said allocation request and said resource allocation change indication.

10. The user equipment according to claim 7,
wherein the user equipment is further configured to:
- evaluate the radio conditions at least of the primary base node, and
- initiate to change the primary base node assignment to the secondary base node in response to the detection of a reduction of the radio conditions below a predetermined threshold.

11. Method for operating a user equipment communicating in parallel by means of a primary base node and at least one secondary base node of a cellular network with a remote terminal and for handling the user equipment in the cellular network, the cellular network comprising at least two radio access networks, the primary base node and the secondary base node being assigned to different radio access networks, the primary base node being the base node said user equipment is camping on in non-connected mode, the secondary base node being a candidate base node chosen by at least one of the user equipment or the cellular network as suited for serving the user equipment, the method comprising the step for the user equipment of:
sending a first capability message comprising available capabilities of the user equipment to the primary base node,
receiving a first indication from the primary base node relating to the capabilities indicated as being used by the primary base node,
sending a second capability message to the secondary base node, comprising at most those capabilities not indicated as being used by the primary base node,
receiving a second indication from the secondary base node relating to the capabilities indicated as being used by the secondary base node,
sending a third capability message with still unused capabilities to the primary base node, and
initiating the communication link by means of the primary base node using the capabilities indicated as being used by the primary base node, and by means of the secondary base node using the capabilities indicated as being used by the secondary base node, and the method comprising the steps for the primary base node of:
receiving the first capability message comprising available capabilities of the user equipment,
determining used capabilities of the available capabilities,
sending the first indication,
receiving the third capability message comprising still unused capabilities of the user equipment, and
serving the user equipment in a setup communication link with the indicated capabilities.

12. The method according to claim 11,
wherein a communication link between the user equipment and the remote terminal by means of the primary base node and at least one secondary base node is active, the method further comprising the step for at least one out of the primary base node and the secondary base node of:
detecting the need for a reallocation change to the user equipment,
sending a stay allocation message to at least one of the other base nodes active in the communication link,
sending an allocation change message to the user equipment, and
receiving a reallocation confirmation message from the user equipment.

13. The method according to claim 12,
the method comprising the steps for the secondary base node of:
upon reception of a stay allocation message from the primary base node, suppressing allocation changes,
receiving from the user equipment a capability message indicating available capabilities, and
sending a completion message indicating that the stay phase is ended to the primary base node.

14. The method according to claim 11,
comprising the step for the primary base node of:
receiving an reception warning message from the user equipment indicating that for a first secondary base nodes active in the communication link the reception conditions at the user equipment are below a predetermined threshold,
determining a second secondary base node suited for serving the user equipment,
sending a free capability message to the first secondary base node, instructing to release the selected capabilities of the user equipment,
sending a response message to the user equipment informing about the released capabilities, and
recommending the second secondary base node to the user equipment.

15. A system comprising:
a user equipment configured to communicate with a remote terminal by means of a primary base node and at least one secondary base node of a cellular network in parallel, the cellular network for use with the user equipment comprising at least two radio access networks, the primary base node and the secondary base node being assigned to different radio access networks, the primary base node being the base node the user equipment is camping on in non-connected mode, the secondary base node being a candidate base node chosen by at least one of the user equipment or the cellular network as suited for serving the user equipment, for setting up a communication link, the user equipment comprises a transmitter/receiver configured to:
send a first capability message comprising available capabilities of the user equipment to the primary base node,
receive a first indication from the primary base node of capabilities indicated as being used by the primary base node,
send a second capability message to the secondary base node, comprising only those capabilities not indicated as being used by the primary base node,
receive a second indication from the secondary base node relating to the capabilities indicated as being used by the secondary base node,
send a third capability message with still unused capabilities to the primary base node, and
initiate setting up the communication link by means of the primary base node using the capabilities indicated as being used by the primary base node, and by means of the secondary base node using the capabilities indicated as being used by the secondary base node, and the primary base node, wherein the primary base node is configured to:
receive the first capability message comprising available capabilities of the user equipment,
determine usable capabilities of the available capabilities,
send the first indication to the user equipment,
receive the third capability message comprising still unused capabilities of the user equipment,
send a message to the user equipment indicating additionally usable capabilities of said unused capabilities, and
serve the user equipment in a setup communication link with the indicated capabilities.

* * * * *